US012757274B2

(12) United States Patent
Elmali et al.

(10) Patent No.: US 12,757,274 B2
(45) Date of Patent: Oct. 6, 2026

(54) COORDINATING MRO ANALYSIS FOR PSCell CHANGE FAILURE

(71) Applicant: Nokia Technologies Oy, Espoo (FI)

(72) Inventors: Ugur Baran Elmali, Munich (DE); Krzysztof Kordybach, Wroclaw (PL); Guillaume Decarreau, Munich (DE)

(73) Assignee: Nokia Technologies Oy, Espoo (FI)

( * ) Notice: Subject to any disclaimer, the term of this patent is extended or adjusted under 35 U.S.C. 154(b) by 333 days.

(21) Appl. No.: 18/558,070

(22) PCT Filed: May 5, 2022

(86) PCT No.: PCT/IB2022/054174

§ 371 (c)(1),
(2) Date: Oct. 30, 2023

(87) PCT Pub. No.: WO2022/234516

PCT Pub. Date: Nov. 10, 2022

(65) Prior Publication Data

US 2024/0215095 A1 Jun. 27, 2024

Related U.S. Application Data

(60) Provisional application No. 63/184,974, filed on May 6, 2021.

(51) Int. Cl.
*H04W 76/18* (2018.01)
*H04L 41/0631* (2022.01)

(52) U.S. Cl.
CPC ......... *H04W 76/18* (2018.02); *H04L 41/0631* (2013.01)

(58) Field of Classification Search
CPC ........................... H04W 76/18; H04L 41/0631
(Continued)

(56) References Cited

U.S. PATENT DOCUMENTS 9,907,110 B2 * 2/2018 Susitaival ............. H04W 76/27
10,993,153 B2 * 4/2021 Teyeb ............ G01R 31/318342
(Continued)

FOREIGN PATENT DOCUMENTS

EP 4236590 A2 8/2023
WO WO-2018203710 A1 * 11/2018 ............ H04W 76/19
(Continued)

OTHER PUBLICATIONS

Office action received for corresponding Japanese Patent Application No. 2023-568135, dated Nov. 26, 2024, 3 pages of office action and 9 pages of translation/summary available.
(Continued)

*Primary Examiner* — Melvin H Pollack
(74) *Attorney, Agent, or Firm* — McCarter & English, LLP

(57) ABSTRACT

In an MN in wireless communication with a UE and in communication with SN(s), after receiving an indication from the UE that an SCG failure has occurred, determining by the MN which node of at least the MN or a last serving SN or another SN is responsible for the SCG failure. Based on the outcome, performing by the MN an analysis for mobility robustness for the SCG failure where the MN was responsible for the SCG failure. In an SN, of an SCG, determining whether or not the SN is responsible for an SCG failure. In response to receiving from the MN a message corresponding to the SCG failure, indicating to the master node by the secondary node whether or not the secondary node is responsible for the secondary cell group failure.

24 Claims, 6 Drawing Sheets

(58) Field of Classification Search
USPC .......................................................... 370/252
See application file for complete search history.

(56) References Cited

U.S. PATENT DOCUMENTS

| | | | | |
|---|---|---|---|---|
| 11,785,483 | B2 * | 10/2023 | Zhang | H04W 36/0058 370/242 |
| 12,035,404 | B2 * | 7/2024 | Cirik | H04B 7/06964 |
| 12,063,702 | B2 * | 8/2024 | Park | H04W 76/11 |
| 12,088,513 | B2 * | 9/2024 | Lee | H04L 1/1887 |
| 12,089,274 | B2 * | 9/2024 | Cheng | H04W 36/0069 |
| 12,120,570 | B2 * | 10/2024 | Eklöf | H04W 36/24 |
| 12,177,919 | B2 * | 12/2024 | Zhang | H04W 24/08 |
| 12,185,402 | B2 * | 12/2024 | Orsino | H04W 76/15 |
| 12,219,375 | B2 * | 2/2025 | Fujishiro | H04W 76/15 |
| 12,238,601 | B2 * | 2/2025 | Takahashi | H04W 36/0058 |
| 12,238,802 | B2 * | 2/2025 | Wu | H04W 36/0079 |
| 12,244,492 | B2 * | 3/2025 | Ramachandra | H04L 45/42 |
| 12,273,776 | B2 * | 4/2025 | Ma | H04W 76/18 |
| 12,284,704 | B2 * | 4/2025 | Teyeb | H04W 76/19 |
| 12,284,710 | B2 * | 4/2025 | Wu | H04W 76/30 |
| 12,317,356 | B2 * | 5/2025 | Luo | H04W 36/305 |
| 12,335,859 | B2 * | 6/2025 | Bergqvist | H04W 48/16 |
| 12,356,271 | B2 * | 7/2025 | Jin | H04W 36/305 |
| 12,382,353 | B2 * | 8/2025 | Kim | H04W 76/18 |
| 12,396,051 | B2 * | 8/2025 | Kim | H04W 36/0079 |
| 12,418,952 | B2 * | 9/2025 | Wu | H04W 24/10 |
| 12,457,653 | B2 * | 10/2025 | Shi | H04B 7/022 |
| 2020/0059395 | A1 * | 2/2020 | Chen | H04W 28/082 |
| 2021/0345437 | A1 * | 11/2021 | Kimba Dit Adamou | H04W 24/04 |
| 2021/0377755 | A1 * | 12/2021 | Luo | H04W 24/04 |
| 2024/0193014 | A1 * | 6/2024 | Yan | H04W 24/04 |
| 2024/0298227 | A1 * | 9/2024 | Wang | H04W 36/00833 |

FOREIGN PATENT DOCUMENTS

| | | | | |
|---|---|---|---|---|
| WO | WO-2020108576 A1 * | 6/2020 | H04B 7/06964 |
| WO | WO-2020147050 A1 * | 7/2020 | H04W 24/02 |
| WO | 2020/198723 A1 | 10/2020 | |
| WO | 2021/019940 A1 | 2/2021 | |

OTHER PUBLICATIONS

"(TP for SON BLCR for 38.423) MRO for SN Change Failure", 3GPP TSG-RAN WG3 Meeting #111-e, R3-210395, Agenda: 10.2.1.6, Huawei, Jan. 25-Feb. 5, 2021, 10 pages.
"Solution for MRO for PSCell change failure", 3GPP TSG-RAN WG3 Meeting #112-e, R3-211556, Agenda item: 10.2.1.6, Nokia, May 17-27, 2021, 5 pages.
"Further discussion on MRO for SN change failure", 3GPP TSG-RAN WG3 Meeting #107-e, R3-200074, Agenda: 10.2.1.3, Nokia, Feb. 24-Mar. 6, 2020, 9 pages.
"Consideration on support of SN change failure in case of MR-DC", 3GPP TSG-RAN WG3 #111-e, R3-210294, Agenda: 10.2.1.6, CATT, Jan. 25-Feb. 4, 2021, 4 pages.
Office action received for corresponding Japan Patent Application No. 2023-568135, dated Sep. 2, 2025, 4 pages of office action and 3 pages of summary available.
"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340, V16.5.0, Mar. 2021, pp. 1-84.
"3rd Generation Partnership Project; Technical Specification Group Radio Access Network; NG-RAN; Xn application protocol (XnAP) (Release 16)", 3GPP TS 38.423, V16.5.0, Apr. 2021, pp. 1-461.
"Revised WID on enhancement of data collection for SON/MDT in NR and EN-DC", 3GPP TSG RAN meeting #88-e, RP-201281, Agenda: 9.10.14, CMCC, Jun. 26-Jul. 3, 2020, 5 pages.
"LS on information needed for MRO in SCG Failure Report", 3GPP TSG-RAN3 Meeting #111-e, R3-211332, RAN3, Jan. 25-Feb. 5, 2021, 1 page.
"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.
"Agenda", 3GPP TSG-RAN WG3 #110-e, R3-205900, Agenda: 3, Chairman, Nov. 2-12, 2020, 20 pages.
International Search Report and Written Opinion received for corresponding Patent Cooperation Treaty Application No. PCT/IB2022/054174, dated Jul. 28, 2022, 10 pages.
Office action received for corresponding India Patent Application No. 202347083019, dated Nov. 3, 2025, 11 pages.

* cited by examiner

COORDINATING MRO ANALYSIS FOR PSCell CHANGE FAILURE

RELATED APPLICATION

This application claims priority to PCT Application No. PCT/IB2022/054174, filed on May 5, 2022, which claims priority to U.S. Provisional Application No. 63/184,974, filed on May 6, 2021, each of which is incorporated herein by reference in its entirety.

TECHNICAL FIELD

Exemplary embodiments herein relate generally to wireless communication systems and, more specifically, relates to mobility robustness optimization (MRO) analysis.

BACKGROUND

In a wireless network such as a cellular network, there is a mechanism referred to as a Minimization of Driving Test (MDT). This mechanism allows User Equipment (UE, a wireless, typically mobile, device) to make certain reports to the cellular network, for use by the cellular network for capacity, coverage, and/or mobility optimization, along with, e.g., quality of service (QOS) verification. These can be important inputs for networks that are Self-Organizing Networks (SON), which can use this information for reconfiguration or other tasks.

In case of Multi-RAT Dual Connectivity (MR-DC, where RAT is radio access technology), a Master Node (MN) functions as the controlling entity that provides control plane connection to the core network, and utilizes an SN (secondary node) for additional resources to the UE. The MN and SN may be two different gNBs (5G, fifth generation, base stations). A Secondary Cell Group (SCG) refers to a group of serving cells associated with the SN, and comprises a Primary Secondary Cell (PSCell), which is the primary cell of the SCG. When a user-equipment (UE) detects a radio failure in the PSCell (i.e., an SCG failure), the UE transmits an SCG Failure Information message to the MN, including the SCG failure type and potential measurement reports that are configured by the MN and/or SN. This report is then used for Mobility Robustness Optimization (MRO) (e.g., with configuration changes to be made in corresponding nodes), among other use cases, e.g., failure detection and recovery.

Coordination of this information for analysis, including MRO analysis, could be improved.

BRIEF SUMMARY

This section is intended to include examples and is not intended to be limiting.

In an exemplary embodiment, a method is disclosed that includes, in a master node in wireless communication with a user equipment and in communication with one or more secondary nodes, after receiving an indication from the user equipment that a secondary cell group failure has occurred, determining by the master node which node of at least the master node or a last serving secondary node or another secondary node is responsible for the secondary cell group failure. The method includes, based on outcome of the determining, performing by the master node an analysis for mobility robustness for the secondary cell group failure where the master node was responsible for the secondary cell group failure.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: in a master node in wireless communication with a user equipment and in communication with one or more secondary nodes, after receiving an indication from the user equipment that a secondary cell group failure has occurred, determine by the master node which node of at least the master node or a last serving secondary node or another secondary node is responsible for the secondary cell group failure; and based on outcome of the determining, perform by the master node an analysis for mobility robustness for the secondary cell group failure where the master node was responsible for the secondary cell group failure.

An exemplary computer program product includes a computer-readable storage medium bearing computer program code embodied therein for use with a computer. The computer program code includes: code for, in a master node in wireless communication with a user equipment and in communication with one or more secondary nodes, after receiving an indication from the user equipment that a secondary cell group failure has occurred, determining by the master node which node of at least the master node or a last serving secondary node or another secondary node is responsible for the secondary cell group failure; and code for based on outcome of the determining, performing by the master node an analysis for mobility robustness for the secondary cell group failure where the master node was responsible for the secondary cell group failure.

In another exemplary embodiment, an apparatus comprises means for performing: in a master node in wireless communication with a user equipment and in communication with one or more secondary nodes, after receiving an indication from the user equipment that a secondary cell group failure has occurred, determining by the master node which node of at least the master node or a last serving secondary node or another secondary node is responsible for the secondary cell group failure; and based on outcome of the determining, performing by the master node an analysis for mobility robustness for the secondary cell group failure where the master node was responsible for the secondary cell group failure.

In an exemplary embodiment, a method is disclosed that includes in a secondary node, of a secondary cell group, in wireless communication with a user equipment and in communication with a master node, determining whether or not the secondary node is responsible for a secondary cell group failure. The method also includes, in response to receiving from the master node a message corresponding to the secondary cell group failure, indicating to the master node by the secondary node whether or not the secondary node is responsible for the secondary cell group failure.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: in a secondary node, of a secondary cell group, in wireless communication with a user equipment and in communication with a master node, determine whether or not the secondary node is responsible for a secondary cell group failure; and in response to receiving from the master node a message corresponding to the secondary cell group failure, indicate to the master node by the secondary node whether or not the secondary node is responsible for the secondary cell group failure.

An exemplary computer program product includes a computer-readable storage medium bearing computer program code embodied therein for use with a computer. The computer program code includes: code for, in a secondary node, of a secondary cell group, in wireless communication with a user equipment and in communication with a master node, determining whether or not the secondary node is responsible for a secondary cell group failure; and code for, in response to receiving from the master node a message corresponding to the secondary cell group failure, indicating to the master node by the secondary node whether or not the secondary node is responsible for the secondary cell group failure.

In another exemplary embodiment, an apparatus comprises means for performing: in a secondary node, of a secondary cell group, in wireless communication with a user equipment and in communication with a master node, determining whether or not the secondary node is responsible for a secondary cell group failure; and in response to receiving from the master node a message corresponding to the secondary cell group failure, indicating to the master node by the secondary node whether or not the secondary node is responsible for the secondary cell group failure.

BRIEF DESCRIPTION OF THE DRAWINGS

In the attached Drawing Figures:

FIG. 3A illustrates the signaling diagram of FIG. 3 for an example where the SN does not send a PSCell change request to the UE that MN was unaware of;

DETAILED DESCRIPTION OF THE DRAWINGS

Figure 1:
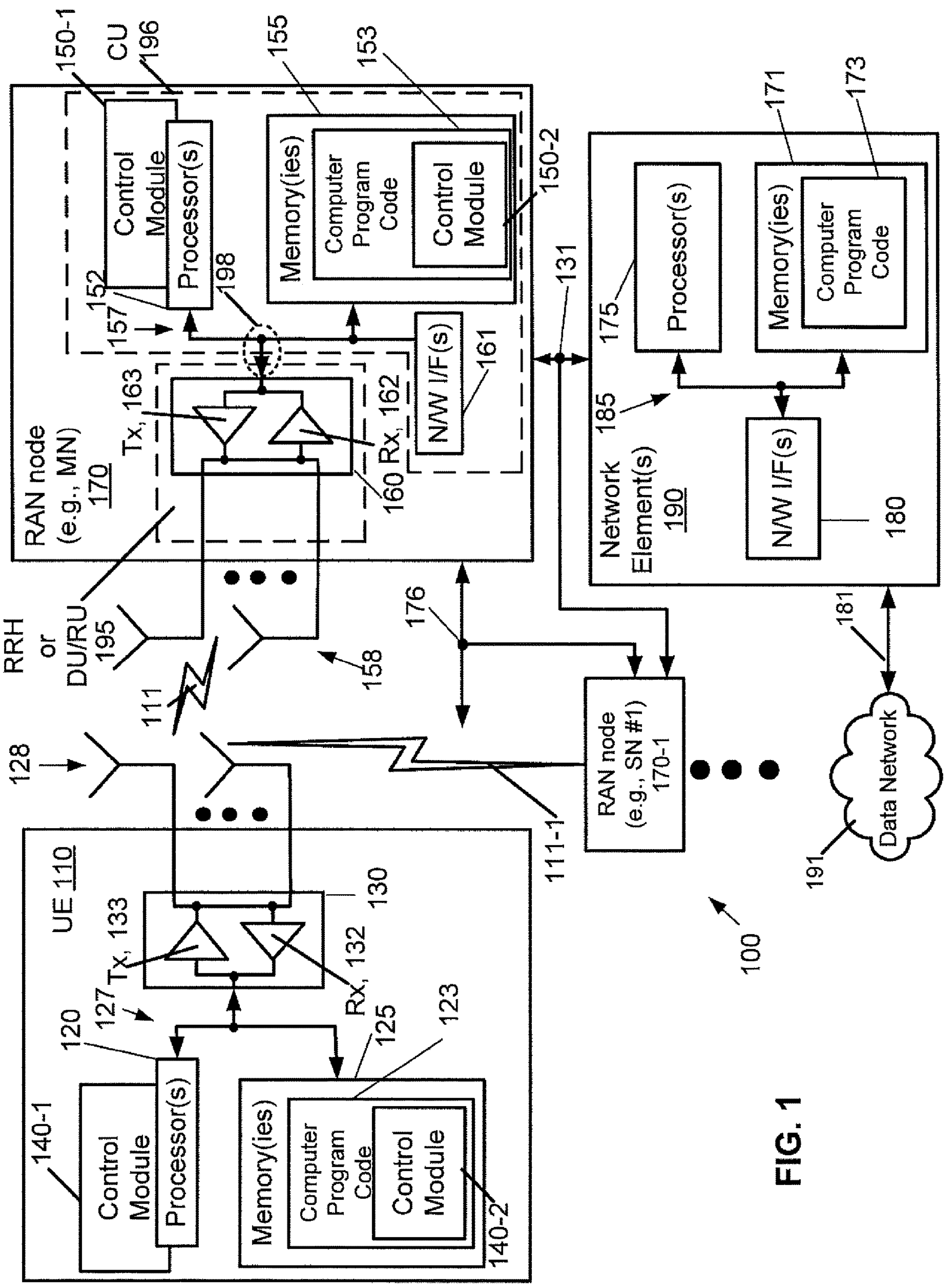
FIG. 1 is a block diagram of one possible and non-limiting exemplary system in which the exemplary embodiments may be practiced.

Abbreviations that may be found in the specification and/or the drawing figures are defined below, at the end of the detailed description section.

The word “exemplary” is used herein to mean “serving as an example, instance, or illustration.” Any embodiment described herein as “exemplary” is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

When more than one drawing reference numeral, word, or acronym is used within this description with “/”, and in general as used within this description, the “/” may be interpreted as “or”, “and”, or “both”.

The exemplary embodiments herein describe techniques for coordinating MRO analysis for PSCell change failure. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, two radio access network (RAN) nodes 170 and 170-1, and network element(s) 190 are illustrated. In FIG. 1, a user equipment (UE) 110 is in wireless communication with a wireless network 100. The wireless network 100 may be a cellular network. A UE is a wireless, typically mobile device that can access a wireless network.

The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111 and with RAN node 170-1 via wireless link 111-1.

The RAN nodes 170, 170-1 are base stations that provides access by wireless devices such as the UE 110 to the wireless network 100. In the examples below, the RAN node 170 is assumed to be a Master Node (MN), and the RAN node 170-1 is assumed to be a Secondary Node (SN). The RAN node 170-1 is assumed to be SN #1, and there are or may be other SNs, which are not illustrated. The RAN nodes 170, 170-1 are assumed to be similar, so the internal configuration of only RAN node 170 is described. Additionally, both may be referred to as gNBs, though as described below, this is only one possibility.

The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170, 170-1 (and possibly other RAN nodes) communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit, gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360-degree area so that the single base station's coverage area covers an approximate oval or circle. Furthermore, each cell can correspond to a single carrier and a base station may use multiple carriers. So, if there are three 120-degree cells per carrier and two carriers, then the base station has a total of six cells.

The wireless network 100 may include a network element or elements 190 that may include core network functionality, and which provides connectivity via a link or links 181 with a data network 191, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN nodes 170, 170-1 are coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor-based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general-purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN nodes 170 and 170-1, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, vehicles with a modem device for wireless V2X (vehicle-to-everything) communication, image capture devices such as digital cameras having wireless communication capabilities, gaming devices having wireless communication capabilities, music storage and playback appliances having wireless communication capabilities, Internet appliances (including Internet of Things, IOT, devices) permitting wireless Internet access and possibly browsing. IoT devices with sensors and/or actuators for automation applications with wireless communication tablets with wireless communication capabilities, as well as portable units or terminals that incorporate combinations of such functions.

Having thus introduced one suitable but non-limiting technical context for the practice of the exemplary embodiments, the exemplary embodiments will now be described with greater specificity.

The development of SON/MDT is to include the support of data collection for SON features, involving coverage and capacity optimization, inter-system/inter-RAT energy saving, inter-system load balancing, 2-step RACH optimization, mobility enhancement optimization, PCI selection, successful handover reports, UE history information in EN-DC, load balancing enhancement, RACH optimization and mobility robustness optimization (MRO) for secondary node (SN) change failure. The inter-node information exchange of the aforementioned procedures, including possible enhancements to S1/NG, X2/Xn, and F1/E1 interfaces, may need to be specified.

Discussions on MRO for SN change failure have been held in 3GPP, and several agreements were made. The following relevant agreements were made in RAN3 #109-e meeting (sec R3-205900, "Agenda", 3GPP TSG RAN3 meeting #110-c, 2-12 November, 2020):

1) In case of a PSCell change failure, when the MN is responsible for SCG mobility, the MN corrects its own configuration (no new signaling towards the SN is needed).
2) In case of a PSCell change failure, when the SN is responsible for SCG mobility, the MN forwards the SCG Failure Information to the SN initiating the last PSCell change (or the last serving SN, in case of a too-late SN change).
3) In case of an SCG failure that is a result of an SN-initiated PSCell change, the SN initiating the last PSCell change (or the last serving SN, in case of a too-late SN change) is responsible to derive the needed correction for its SCG mobility configuration.
4) To support a pre-Rel-17 UE, in case of SCG failure, the MN shall be able to identify if the last PSCell change was initiated by itself or an SN, and which SN it was. Further enhancements may be based on enhanced SCG failure information provided from the UE.

As the last item above indicates, Rel-17 UEs may report an SCG failure information message that can include more elements than what is already in the report, in order for the MN to be able to identify if the last PSCell change was initiated by itself or an SN, and which SN it was that initiated. However, additional mechanisms are needed for the support of MRO for pre-Rel-17 UEs that would still send the conventional SCG failure information message in case of an SCG failure.

Furthermore, it has been also agreed that the MN performs initial analysis to identify the node that caused the failure. The node that caused the failure performs root cause analysis.

Based on the agreements provided above, the MN can forward the SCG failure information to the serving SN, or the SN initiating the last PSCell change, for the SN to make configuration changes (i.e., MRO), after an initial analysis to identify the node that caused the failure. On the other hand, the MN may directly use the SCG failure information and make its own configuration changes, in case for example the MN thinks that the MN is responsible for the SCG mobility and the SCG failure. More specifically, in case the MN finds out, after an initial MRO analysis after receiving the SCG failure information from the UE, that this is a "too early PSCell change" failure, or a "PSCell change failure to wrong PSCell", and the SN is responsible for the PSCell change that caused the failure, then the MN forwards the SCG failure information to the source SN (not to the serving SN). On the other hand, in case the MN thinks that this is a "too late PSCell change" failure caused by the SN, then the MN forwards the SCG failure information to the serving SN.

Moreover, both MN and SN can be responsible for SCG mobility, and this responsibility is not officially reflected in the current specifications. In addition, the SN can change the PSCell of the UE without notifying the MN (e.g., an intra-SN PSCell change without MN involvement) using the dedicated signaling radio bearer between the SN and the UE (SRB3), in case of EN-DC, NG EN-DC and NR-DC. In that case, the MN is not aware of the PSCell change, although the MN still knows the correct SN to which the UE is connected. If the UE location is being tracked, however, intra-SN PSCell changes initiated by the SN are also reported to the MN by the SN. Intra-SN PSCell change without MN involvement is introduced in order to preserve SN autonomy, and the procedure aims to have a lowest amount of signaling towards the MN as is possible.

A focus is placed herein on the error in the understanding of the MN that occurs in case of intra-SN PSCell change without MN involvement, where the UE location tracking is disabled for the UE, which would eventually cause MRO problems.

In more detail, as described previously, the concept of intra-SN PSCell change without MN involvement was introduced to let the SN make autonomous decisions on the PSCell of the UE without any MN interaction, and avoid unnecessary signaling towards the MN. In case the location of the UE is being tracked by the MN, e.g., for lawful interception purposes, which is optional and applied only to selected UEs, then the SN notifies the MN in case of intra-SN PSCell change failure, but does so only after the PSCell is changed (to avoid any delay of the change).

Consider a scenario where the MN initiates a PSCell change for a UE that is successfully completed (inter-SN or intra-SN), or where the SN initiates an inter-SN PSCell change. In both cases, the MN would be aware of the change, since the MN is involved in those procedures. After a while, the serving SN may initiate independently another intra-SN PSCell change via, e.g., SRB3 without MN involvement. This may occur, even if it is assumed that only one of the nodes should be responsible for SCG mobility, because measurement-based mobility may not be the only trigger for PSCell changes. For example, if one layer (in this scenario, the SN) is responsible for "normal" mobility, the other layer (MN here) may decide to execute load-based or service-based SN change.

After the UE connects to the PSCell that is indicated by the SN, this PSCell may fail soon after the change. Based on the measurements reported from the UE, this scenario would conventionally be identified as a "PSCell change failure to wrong cell", "too early PSCell change failure" or a "too late PSCell change failure" that is caused by the SN, and the SN would make its own configuration changes for MRO purposes.

However, since the MN is not aware of the intra-SN PSCell change initiated by the SN, upon reception of the SCG failure information sent by the UE, the MN would assume the failure is related to the PSCell change triggered by the MN itself, and would not forward the SCG failure information to the SN based on the current agreements described above. Even if the MN forwards the message to the SN for purposes other than MRO, the MN would make its own configuration changes for MRO, as the MN would think that the SCG failure was caused by itself. On top of that, the SN would also make own configuration changes for MRO. One of the two corrective actions are not necessary and may thus worsen the performance instead of improving the performance (also, the statistics, if collected, would be badly impacted). Thus, the current mechanisms are not sufficient for successful MRO operation under the given scenario.

Figure 2:
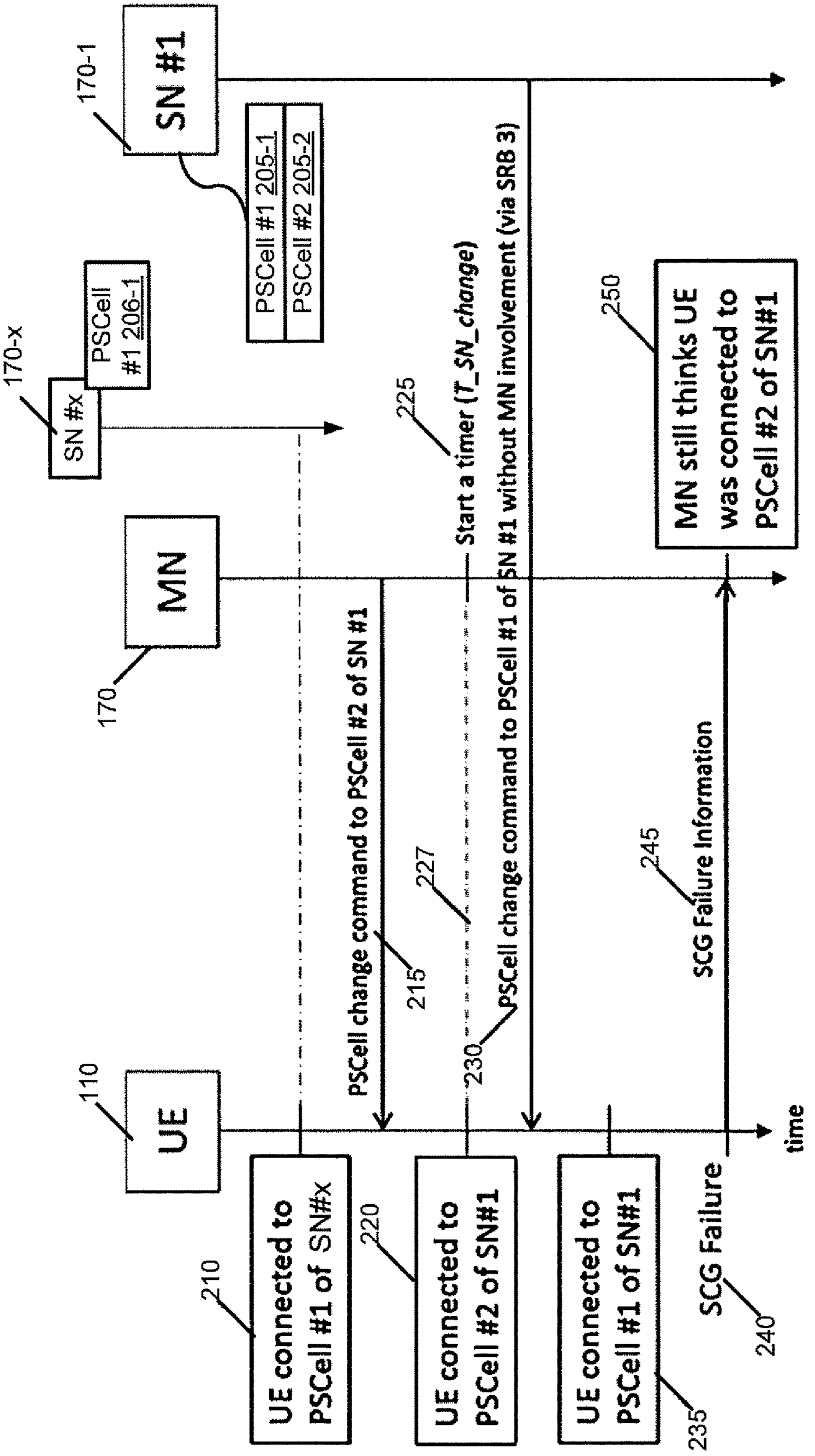
FIG. 2 is an example of a high-level signaling diagram of a scenario illustrating PSCell change commands from the MN and SN.

FIG. 2 shows an example signaling diagram indicating the high-level decisions made by the UE, MN and SN, and illustrates the described scenario (the figure shows the scenario where the first PSCell change was triggered by MN, however, as stated earlier, the scenario where another SN initiates an inter-SN PSCell change is also valid). The UE 110, RAN node 170, as the MN, RAN node 170-*x*, as the SN #x and RAN node 170-1, as the SN #1, are illustrated. The SN #1 170-1 has two possible cells #1 205-1 and #2 205-2. Note that there may be other cells formed by the SN, as described in the text above about cells and base stations, but only these two are used for these examples.

In block 210, the UE is connected to the PSCell #1 206-1 of SN #x 170-*x*. In signaling 215, the MN 170 may send a PSCell change command, to cause the UE 110 to transition to PSCell #2 205-2 of SN #1 170-1. It is noted that this assumes the MN 170 performs an inter-node cell change, i.e., from PSCell #1 206-1 of SN #x to PSCell #2 205-2 of SN #1. However, it may also be possible for the MN 170 to perform an intra-node cell change, such as where the UE 110 is initially connected to PSCell #1 205-1 and the MN sends a cell change command to have the UE change from PSCell #1 205-1 to PSCell #205-2 in the SN #1. In block 220, the UE 110 is connected to the PSCell #2 205-2 of SN #1 170-1.

As indicated by reference 225, the MN 170 may start a timer, such as T_SN_change. This timer may be started by the MN in response to the UE completing a PSCell change. This may be used to make an "initial analysis" on the MRO issue, and the value may be used to determine the cause of the failure. The dashed line 227 indicates the completion of the PSCell change initiated by the MN.

In signaling 230, the SN #1 170-1 may send a PSCell change command to UE 110, and this sending is performed without MN 170 involvement (such as for example via SRB 3 or other signaling). The SN can change the PSCell based on different reasons, such as load balancing, measurements, and the like. The UE 110 in block 235 is connected to the PSCell #1 205-1 of SN #1 170-1.

The UE 110 in reference 240 may determine there was an SCG failure and, in response, may send signaling 245 with indication of the SCG failure information to the MN 170. Block 250 indicates that the MN, in response to receiving the signaling 245, may still think the UE was connected to the PSCell #2 205-2 of SN #1 170-1.

Hence, one exemplary objective of the exemplary embodiments is to provide mechanisms to successfully perform MRO for SN change failure in case of a PSCell change without an MN involvement, which causes an SCG failure.

As an overview, it is proposed that, after an SCG failure is detected by the MN 170, the serving SN 170-1 may provide information to the MN 170 about a possible PSCell change that might have been initiated by the serving SN after the previous MN-initiated SN change (or a previous inter-SN PSCell change that was initiated by another SN). The information from the serving SN is assumed to be sent after an initiation by the MN by sending the information about PSCell change failure. The SN may respond to MN's information with a confirmation or denial that the SN is related to the SN-internal PSCell change, or may send a message in case the SN takes over the MRO handling.

As one example, the MN may select one of multiple options for performing an analysis for mobility robustness for a secondary cell group failure:

1—The MN can perform an MRO analysis if the MN is responsible for the SCG failure.

2—The MN can forward the SCG failure to another SN, which is responsible for the SCG failure. The other SN performs the MRO analysis. (The MN may also perform an MRO analysis.)

3—The MN can do nothing/take no action, since the last serving SN is responsible for the SCG failure. Instead, the last serving SN performs the MRO analysis, and the MN has determined the SN is responsible for the MRO analysis.

Two example implementation options are proposed for this coordination between the MN, last serving SN, and/or another SN.

Figure 3:
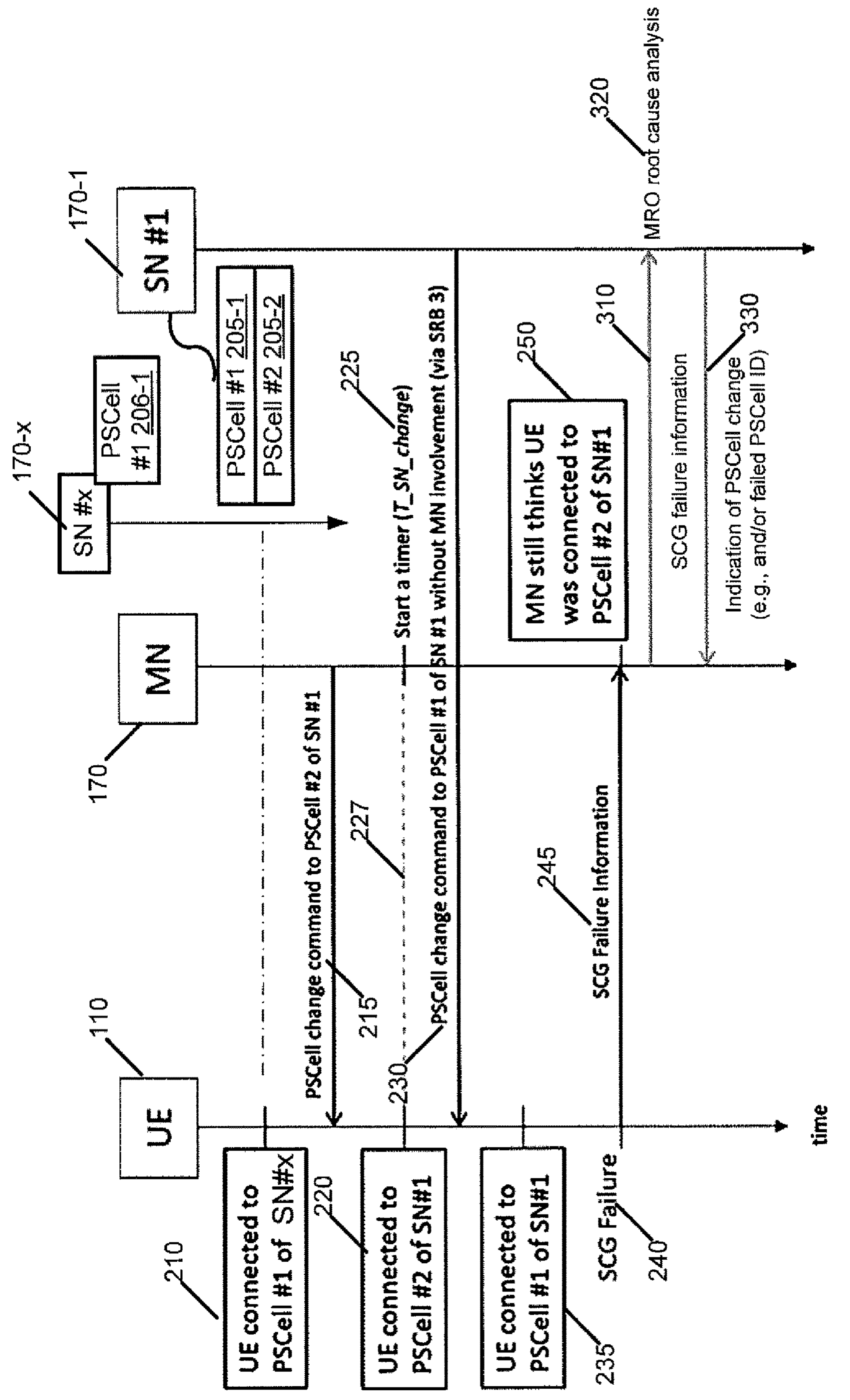
FIG. 3 is a high-level signaling diagram of a first implementation option for an exemplary embodiment.

The first option, Option 1, is described in reference to FIG. 3, which is a high-level signaling diagram of a first implementation option for an exemplary embodiment. This signaling diagram illustrates the operation of an exemplary method or methods, a result of execution of computer program instructions embodied on a computer readable memory, functions performed by logic implemented in hardware, and/or interconnected means for performing functions in accordance with exemplary embodiments. References 210-250 of FIG. 3 are the same as in FIG. 2, and therefore will not be discussed.

In FIG. 3, the MN 170 may forward, in signaling 310, the SCG failure information in signaling 245 to the SN #1

170-1. In signaling 330, the SN #1 170-1 may signal indication of the PSCell change and (in this example) failed PSCell ID (e.g., of the PSCell #1 205-1) to the MN 170.

The following are numbered notes about this first option and its process.

1. The MN 170 may forward the SCG failure information received (in signaling 245) from the UE to the serving SN, even in case the MN thinks the MN itself is responsible for the PSCell change failure.
2. The forwarded SCG failure information from the MN to the serving SN may be replied by the SN (see, e.g., signaling 330).
   i. The reply message may indicate whether the SN has recently initiated a PSCell change without MN involvement, and possibly the serving PSCell ID in case the SN has initiated a recent PSCell change.
   a) In another aspect, the SN 170-1 may only indicate the serving PSCell ID. The MN 170 can then compare this information with its own understanding of serving PSCell to decide on further steps. This would further decrease the size of the message from the SN to the MN.
3. Based on the information obtained from the serving SN with the message in signaling from the SN, the MN may additionally forward the SCG failure information to a source SN that had initiated the last inter-SN PSCell change (that is, a PSCell change from the source SN to the current serving SN), or the MN may make its own configuration changes for MRO purposes. See FIG. 3A, which illustrates the signaling diagram of FIG. 3 for an example where the SN does not send a PSCell change command to the UE (there is no signaling 230 or UE connection to PSCell #1 in block 235, as there is in FIG. 3), and where the signaling 350 from the SN is an indication of no initiation of PSCell change. In response, the MN 170 may follow a conventional MRO procedure in block 360. In block 370, the MN 170 may forward the SCG failure information to the source SN (where the source SN is not shown).

Figure 4:
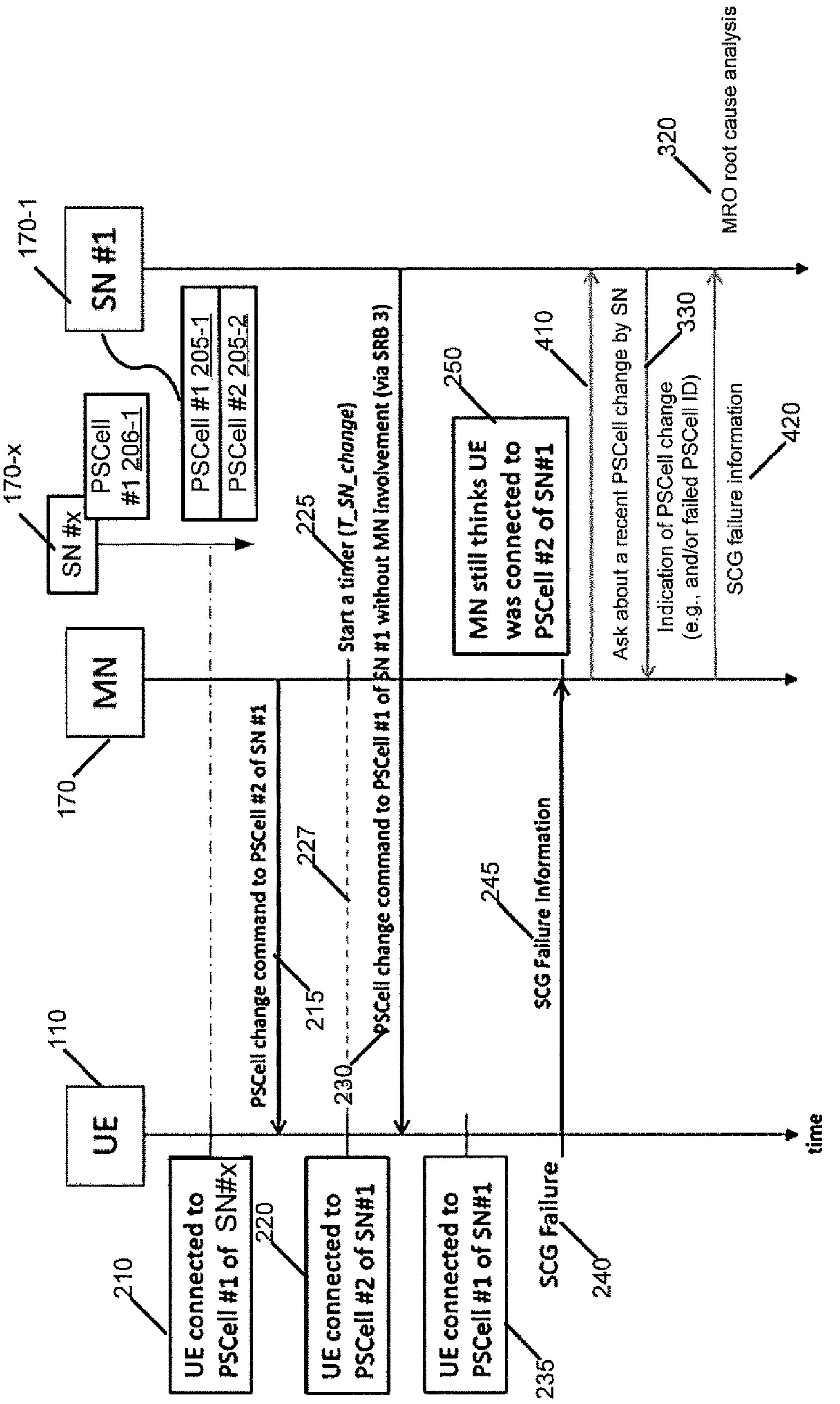
FIG. 4 is a high-level signaling diagram of a second implementation option for an exemplary embodiment.

A second option, Option 2, is described in reference to FIG. 4, which is a high-level signaling diagram of a second implementation option for an exemplary embodiment. This signaling diagram illustrates the operation of an exemplary method or methods, a result of execution of computer program instructions embodied on a computer readable memory, functions performed by logic implemented in hardware, and/or interconnected means for performing functions in accordance with exemplary embodiments. References 210-250 of FIG. 4 are the same as in FIG. 2, and therefore will not be discussed.

In FIG. 4, the MN 170 may signal, in signaling 410, a message to the SN #1 170-1 asking about a recent PSCell change by the SN #1 170-1. In signaling 330, the SN #1 170-1 may signal indication of the PSCell change and (in this example) failed PSCell ID (e.g., of the PSCell #1 205-1) to the MN 170. The MN 170 may send, in signaling 420, SCG failure information (e.g., received in signaling 245) to the SN #1 170-1, when it receives an indication from the SN #1 170-1 indicating there was a PSCell change and a failure of the SCG cell change. The SN #1 170-1, as indicated by reference 320, may perform an MRO root cause analysis, when it determines that the last PSCell change was initiated by itself and that serving PSCell has failed.

The following are numbered notes about this second option and its process.

1. Upon reception (in signaling 245) of the SCG failure information from the UE, the MN 170 may send a message (see signaling 410) to the serving SN 170-1, asking whether the SN has recently initiated an intra-SN PSCell change or not.
   a. The size of the message can be much smaller than the size of SCG failure information (even ~1-bit).
2. The SN 170-1 may reply to the MN 170. The response may include an indication of a recently initiated PSCell change (or an indication of a no such change, see FIG. 4A, described below), or also an additional serving PSCell ID. The example of signaling 330 includes both. The SN #1 170-1 performs the MRO root cause analysis in reference 320 only if the SN has actually initiated a PSCell change without MN awareness (and after the SN #1 170-1 has received the SCG failure information from signaling 420). Otherwise, the SN would send an indication to MN that it did not change PSCell without notifying MN. See FIG. 4A, described below.
3. Based on a positive reply from the SN 170-1 regarding a recent PSCell change and possibly the failed PSCell ID, SCG failure information can be forwarded to the serving SN 170-1 by the MN 170. This is illustrated by signaling 420.
4. If the MN receives a negative reply, which indicates that the serving SN has not initiated an intra-SN PSCell change, the MN 170 can follow conventional MRO procedures. See also FIG. 4A, described below.

Further comments and details on these procedures are provided below.

Regarding Option 1—Note 1: In case the MN 170 determines (upon an initial MRO analysis) that the MN itself is the initiator of the last PSCell change, conventionally, the MN 170 would not send the SCG failure information received from the UE (in signaling 245) upon PSCell failure to the serving SN for MRO, based on the latest agreements described above. Instead, the MN would make its own configuration changes for MRO purposes. Furthermore, in case the MN determines that the initiator of the last PSCell change is a source SN other than the serving SN (upon an initial MRO analysis), based on agreements provided above, the MN would forward the SCG failure information to the source SN. What is proposed herein, by contrast, is that the MN forwards SCG failure information initially to the serving SN for MRO purposes, at least for Option 1.

Regarding Option 1—Note 2: If upon note 2-i-a the MN finds out that the last serving PSCell of the UE is different than what MN thinks as the last serving PSCell, then the MN would conclude that a PSCell change without MN involvement had been performed, which caused current PSCell change failure. If that is the case, the MN neither makes its own MRO re-configurations, nor forwards the SCG failure information to a source SN, as the serving SN would perform MRO root cause analysis.

Figure 3A:
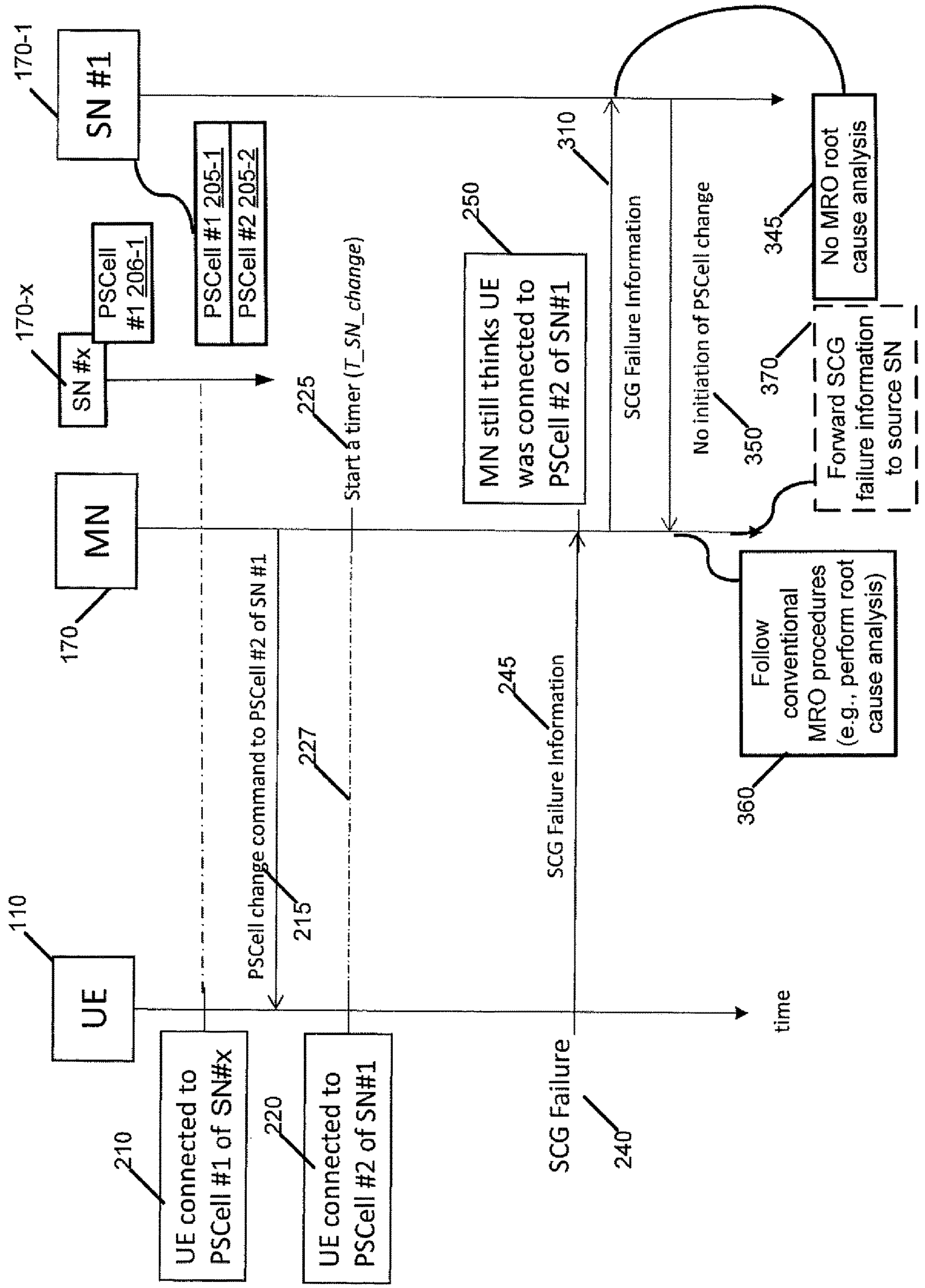

If the MN finds out that the serving SN had not initiated an additional PSCell change without MN involvement, then the MN would perform MRO root cause analysis, and make its own configurations, in case the MN has initiated the last PSCell change. Refer to FIG. 3A, which illustrates the signaling diagram of FIG. 3 for an example where the SN does not send a PSCell change command to the UE. That is, there is no signaling 230 or UE connection to PSCell #1 in block 235, as there is in FIG. 3. Instead, in FIG. 3A, there is no PSCell change command from the SN #1 170-1. In this case, the SN #1 170-1 receives the SCG failure information in signaling 310, but may indicate (see block 350) there was no initiation of the PSCell change by the SN. In more detail, the SN #1 170-1 performs the MRO root cause analysis in reference 320 of FIG. 3 only if the SN has actually initiated a PSCell change without MN awareness. Otherwise, the SN would send an indication to MN that it did not change PSCell without notifying MN. See signaling 350. In that case, root cause analysis is not performed by the SN #1 170-1, see block 345, and is instead performed either by the MN or the previous SN. For instance, the MN 170 may then follow conventional MRO procedures in block 360 and, e.g., perform a root cause analysis. On the other hand, if the last initiator of the PSCell change of the UE is another SN, then the MN may forward the SCG failure information to that source SN, e.g., via signaling to that source SN.

Figure 4A:
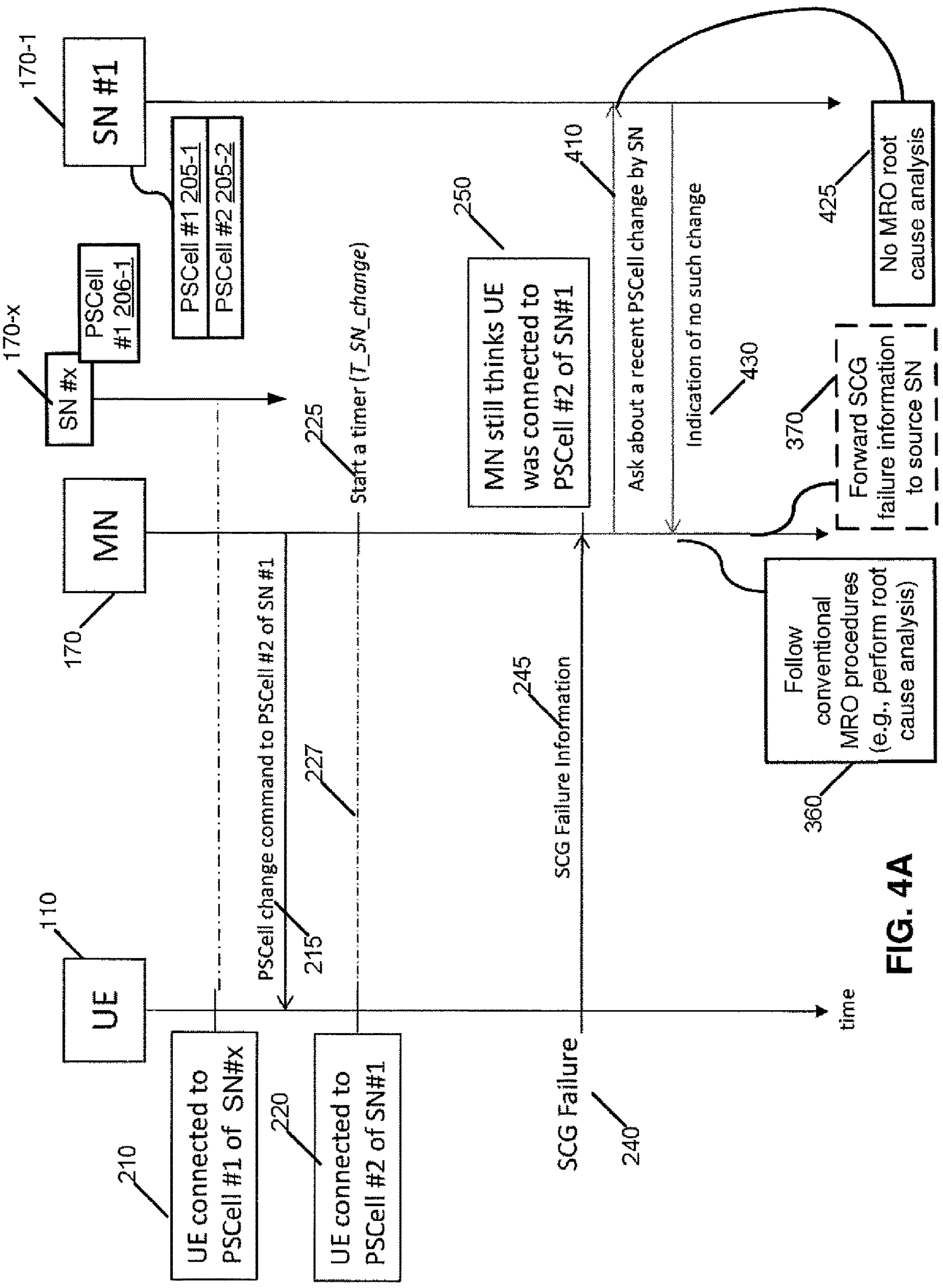
FIG. 4A illustrates the signaling diagram of FIG. 4 for an example where the SN does not send a PSCell change request to the UE.

Regarding Option 2—Note 4: Refer to FIG. 4A, which illustrates the signaling diagram of FIG. 4 for an example where the SN does not send a PSCell change request to the UE. In this example, there is not a PSCell change command by the SN #1 170-1, and the UE therefore does not connect to PSCell #1 205-1. The SN #1 170-1 does not perform an MRO root cause analysis (see block 425). If the MN finds out that the serving SN had not initiated an additional PSCell change without MN involvement (e.g., via signaling in block 430 indicating no such change), then the MN would perform MRO root cause analysis (see block 360) (and/or perform other conventional MRO procedures), and makes its own configurations, in case the MN has initiated the last PSCell change. On the other hand, if the last initiator of the PSCell change of the UE is another SN, then the MN may forward SCG failure information to that source SN. See block 370.

Without in any way limiting the scope, interpretation, or application of the claims appearing below, a technical effect and advantage of one or more of the example embodiments disclosed herein is that a possible misunderstanding of an MN on the initiator of the last PSCell change for a UE would be mitigated, paving the way to successful MRO for SN change failure.

The following are additional examples.

Example 1. A method, comprising:

in a master node in wireless communication with a user equipment and in communication with one or more secondary nodes, after receiving an indication from the user equipment that a secondary cell group failure has occurred, determining by the master node which node of at least the master node or a last serving secondary node or another secondary node is responsible for the secondary cell group failure; and based on outcome of the determining, performing by the master node an analysis for mobility robustness for the secondary cell group failure where the master node was responsible for the secondary cell group failure.

Example 2. The method of example 1, wherein determining which node is responsible for the secondary cell group failure further comprises determining by the master node the last serving secondary node is the node responsible for the secondary cell group failure, based on communication with the last serving secondary node indicating the last serving secondary node was involved in an intra-node cell change that was not indicated to the master node.

Example 3. The method of example 2, further comprising:

sending by the master node information corresponding to the secondary cell group failure toward the last serving secondary node; and receiving, by the master node from the last serving secondary node, information comprising one or both of an indication the last serving secondary node was involved in an intra-node cell change without notifying the master node or an identification of the last serving cell that was involved in the secondary cell group failure.

Example 4. The method of example 2, further comprising:

sending by the master node a message asking the last serving secondary node whether the last serving secondary node performed an intra-node cell change without notifying the master node;

receiving, by the master node from the last serving secondary node, information comprising one or both of an indication the last serving secondary node was involved in the intra-node cell change without notifying the master node or an identification of the last serving cell that was involved in the secondary cell group failure; and sending by the master node information corresponding to the secondary cell group failure toward the last serving secondary node.

Example 5. The method of one of examples 2 to 4, wherein the analysis by the master node for mobility robustness for the secondary cell group failure determines the secondary node is to perform an analysis for mobility robustness for the secondary cell group failure.

Example 6. The method of example 1, wherein determining which node is responsible for the secondary cell group failure further comprises determining by the master node the last serving secondary node is not the node responsible for the secondary cell group failure, based on communication with the secondary node indicating the last serving secondary node was not involved in an intra-node cell change that was not indicated to the master node.

Example 7. The method of example 6, further comprising sending by the master node information corresponding to the secondary cell group failure toward the last serving secondary node; and further comprising receiving, by the master node from the last serving secondary node, information comprising an indication the last serving secondary node was not involved in an intra-node cell change without notifying the master node;

wherein the performing by the master node an analysis where the master node was responsible in the secondary cell group failure comprises using the received information in an analysis by the master node for mobility robustness, in response to the received information indicating that the last serving secondary node was not involved in the intra-node cell change without notifying the master node.

Example 8. The method of example 6, further comprising:

sending by the master node a message asking the last serving secondary node whether the last serving secondary node performed an intra-node cell change without notifying the master node; and receiving, by the master node from the last serving secondary node, information comprising an indication the last serving secondary node was not involved in the intra-node cell change without notifying the master node; and wherein the performing by the master node an analysis where the master node was responsible in the secondary cell group failure comprises using the received information in an analysis by the master node for mobility robustness, in response to the received information indicating that the last serving secondary node was not involved in the intra-node cell change without notifying the master node.

Example 9. The method of example 7 or 8, wherein determining by the master node which node of at least the master node or the last serving secondary node or another secondary node is responsible for the secondary cell group failure further comprises determining by the master node the other secondary node is responsible for the secondary cell group failure and sending by the master node failure information for the secondary cell group failure toward the other secondary node.

Example 10. A method, comprising:

in a secondary node, of a secondary cell group, in wireless communication with a user equipment and in communication with a master node, determining whether or not the secondary node sent an intra-node cell change command to the user equipment commanding the user equipment to perform the intra-node cell change; and in response to receiving from the master node a message corresponding to a secondary cell group failure, indicating to the master node by the secondary node whether or not the secondary node sent the command for the intra-node cell change without notifying the master node.

Example 11. The method of example 10, wherein the indicating by the secondary node whether or not the secondary node sent the command for the intra-node cell change without notifying the master node further comprises performing by the secondary node communication with the master node indicating the secondary node was involved in the intra-node cell change that was not indicated to the master node.

Example 12. The method of example 11, further comprising receiving by the secondary node from the master node information corresponding to the secondary cell group failure; and further comprising performing by the secondary node an analysis for mobility robustness for the secondary cell group failure;

wherein the indicating by the secondary node whether or not the secondary node sent the command for the intra-node cell change without notifying the master node comprises sending, by the secondary node toward the master node, information comprising one or both of an indication the secondary node was involved in an intra-node cell change without notifying the master node or an identification of the last serving cell that was involved in the secondary cell group failure.

Example 13. The method of example 11, further comprising receiving by the secondary node from the master node a message asking the secondary node whether the secondary node performed an intra-node cell change without notifying the master node;

further comprising receiving by the secondary node from the master node information corresponding to the secondary cell group failure; and further comprising performing by the secondary node an analysis for mobility robustness for the secondary cell group failure;

wherein the indicating by the secondary node whether or not the secondary node sent the command for the intra node cell change without notifying the master node comprises sending, by the secondary node toward the master node, information comprising one or both of an indication the secondary node was involved in an intra-node cell change without notifying the master node or an identification of the last serving cell that was involved in the secondary cell group failure.

Example 14. The method of example 10, wherein the indicating by the secondary node whether or not the secondary node sent the command for the intra-node cell change without notifying the master node further comprises performing communication by the secondary node with the master node indicating the secondary node was not involved in the intra-node cell change that was not indicated to the master node.

Example 15. The method of example 14, further comprising receiving by the secondary node from the master node information corresponding to the secondary cell group failure; and wherein the indicating by the secondary node whether or not the secondary node sent the command for the intra-node cell change without notifying the master node further comprises the secondary node sending information comprising an indication the secondary node was not involved in the intra-node cell change without notifying the master node.

Example 16. The method of example 14, further comprising receiving by the secondary node from the master node a message asking the secondary node whether the secondary node performed an intra-node cell change without notifying the master node; and wherein the indicating by the secondary node whether or not the secondary node sent the command for the intra-node cell change without notifying the master node further comprises the secondary node sending information comprising an indication the secondary node was not involved in the intra-node cell change without notifying the master node.

Example 17. A computer program, comprising code for performing the methods of any of examples 1 to 16, when the computer program is run on a computer.

Example 18. The computer program according to example 17, wherein the computer program is a computer program product comprising a computer-readable medium bearing computer program code embodied therein for use with the computer.

Example 19. The computer program according to example 17, wherein the computer program is directly loadable into an internal memory of the computer.

Example 20. An apparatus, comprising means for performing:

in a master node in wireless communication with a user equipment and in communication with one or more secondary nodes, after receiving an indication from the user equipment that a secondary cell group failure has occurred, determining by the master node which node of at least the master node or a last serving secondary node or another secondary node is responsible for the secondary cell group failure; and based on outcome of the determining, performing by the master node an analysis for mobility robustness for the secondary cell group failure where the master node was responsible for the secondary cell group failure.

Example 21. The apparatus of example 20, wherein determining which node is responsible for the secondary cell group failure further comprises determining by the master node the last serving secondary node is the node responsible for the secondary cell group failure, based on communication with the last serving secondary node indicating the last serving secondary node was involved in an intra-node cell change that was not indicated to the master node.

Example 22. The apparatus of example 21, wherein the means are further configured for performing:

sending by the master node information corresponding to the secondary cell group failure toward the last serving secondary node; and receiving, by the master node from the last serving secondary node, information comprising one or both of an indication the last serving secondary node was involved in an intra-node cell change without notifying the master node or an identification of the last serving cell that was involved in the secondary cell group failure.

Example 23. The apparatus of example 21, wherein the means are further configured for performing:

sending by the master node a message asking the last serving secondary node whether the last serving secondary node performed an intra-node cell change without notifying the master node;

receiving, by the master node from the last serving secondary node, information comprising one or both of an indication the last serving secondary node was involved in the intra-node cell change without notifying the master node or an identification of the last serving cell that was involved in the secondary cell group failure; and sending by the master node information corresponding to the secondary cell group failure toward the last serving secondary node.

Example 24. The apparatus of one of examples 21 to 23, wherein the analysis by the master node for mobility robustness for the secondary cell group failure determines the secondary node is to perform an analysis for mobility robustness for the secondary cell group failure.

Example 25. The apparatus of example 20, wherein determining which node is responsible for the secondary cell group failure further comprises determining by the master node the last serving secondary node is not the node responsible for the secondary cell group failure, based on communication with the secondary node indicating the last serving secondary node was not involved in an intra-node cell change that was not indicated to the master node.

Example 26. The apparatus of example 25, wherein the means are further configured for performing: sending by the master node information corresponding to the secondary cell group failure toward the last serving secondary node; and wherein the means are further configured for performing: receiving, by the master node from the last serving secondary node, information comprising an indication the last serving secondary node was not involved in an intra-node cell change without notifying the master node;

wherein the performing by the master node an analysis where the master node was responsible in the secondary cell group failure comprises using the received information in an analysis by the master node for mobility robustness, in response to the received information indicating that the last serving secondary node was not involved in the intra-node cell change without notifying the master node.

Example 27. The apparatus of example 25, wherein the means are further configured for performing:

sending by the master node a message asking the last serving secondary node whether the last serving secondary node performed an intra-node cell change without notifying the master node; and receiving, by the master node from the last serving secondary node, information comprising an indication the last serving secondary node was not involved in the intra-node cell change without notifying the master node; and wherein the performing by the master node an analysis where the master node was responsible in the secondary cell group failure comprises using the received information in an analysis by the master node for mobility robustness, in response to the received information indicating that the last serving secondary node was not involved in the intra-node cell change without notifying the master node.

Example 28. The apparatus of example 26 or 27, wherein determining by the master node which node of at least the master node or the last serving secondary node or another secondary node is responsible for the secondary cell group failure further comprises determining by the master node the other secondary node is responsible for the secondary cell group failure and sending by the master node failure information for the secondary cell group failure toward the other secondary node.

Example 29. An apparatus, comprising means for performing:

in a secondary node, of a secondary cell group, in wireless communication with a user equipment and in communication with a master node, determining whether or not the secondary node sent an intra-node cell change command to the user equipment commanding the user equipment to perform the intra-node cell change; and in response to receiving from the master node a message corresponding to a secondary cell group failure, indicating to the master node by the secondary node whether or not the secondary node sent the command for the intra-node cell change without notifying the master node.

Example 30. The apparatus of example 29, wherein the indicating by the secondary node whether or not the secondary node sent the command for the intra-node cell change without notifying the master node further comprises performing by the secondary node communication with the master node indicating the secondary node was involved in the intra-node cell change that was not indicated to the master node.

Example 31. The apparatus of example 30, wherein the means are further configured for performing: receiving by the secondary node from the master node information corresponding to the secondary cell group failure; and wherein the means are further configured for performing: performing by the secondary node an analysis for mobility robustness for the secondary cell group failure;

wherein the indicating by the secondary node whether or not the secondary node sent the command for the intra-node cell change without notifying the master node comprises sending, by the secondary node toward the master node, information comprising one or both of an indication the secondary node was involved in an intra-node cell change without notifying the master node or an identification of the last serving cell that was involved in the secondary cell group failure.

Example 32. The apparatus of example 30, wherein the means are further configured for performing: receiving by the secondary node from the master node a message asking the secondary node whether the secondary node performed an intra-node cell change without notifying the master node;

wherein the means are further configured for performing: receiving by the secondary node from the master node information corresponding to the secondary cell group failure; and wherein the means are further configured for performing: performing by the secondary node an analysis for mobility robustness for the secondary cell group failure;

wherein the indicating by the secondary node whether or not the secondary node sent the command for the intra node cell change without notifying the master node comprises sending, by the secondary node toward the master node, information comprising one or both of an indication the secondary node was involved in an intra-node cell change without notifying the master node or an identification of the last serving cell that was involved in the secondary cell group failure.

Example 33. The apparatus of example 29, wherein the indicating by the secondary node whether or not the secondary node sent the command for the intra-node cell change without notifying the master node further comprises performing communication by the secondary node with the master node indicating the secondary node was not involved in the intra-node cell change that was not indicated to the master node.

Example 34. The apparatus of example 33, wherein the means are further configured for performing: receiving by the secondary node from the master node information corresponding to the secondary cell group failure; and wherein the indicating by the secondary node whether or not the secondary node sent the command for the intra-node cell change without notifying the master node further comprises the secondary node sending information comprising an indication the secondary node was not involved in the intra-node cell change without notifying the master node.

Example 35. The apparatus of example 33, wherein the means are further configured for performing: receiving by the secondary node from the master node a message asking the secondary node whether the secondary node performed an intra-node cell change without notifying the master node; and wherein the indicating by the secondary node whether or not the secondary node sent the command for the intra-node cell change without notifying the master node further comprises the secondary node sending information comprising an indication the secondary node was not involved in the intra-node cell change without notifying the master node.

Example 36. The apparatus of any preceding apparatus example, wherein the means comprises:

at least one processor; and at least one memory including computer program code, the at least one memory and computer program code configured to, with the at least one processor, cause the performance of the apparatus.

Example 37. An apparatus, comprising:

one or more processors; and one or more memories including computer program code, wherein the one or more memories and the computer program code are configured, with the one or more processors, to cause the apparatus to:

in a master node in wireless communication with a user equipment and in communication with one or more secondary nodes, after receiving an indication from the user equipment that a secondary cell group failure has occurred, determine by the master node which node of at least the master node or a last serving secondary node or another secondary node is responsible for the secondary cell group failure; and based on outcome of the determining, perform by the master node an analysis for mobility robustness for the secondary cell group failure where the master node was responsible for the secondary cell group failure.

Example 38. A computer program product comprising a computer-readable storage medium bearing computer program code embodied therein for use with a computer, the computer program code comprising:

in a master node in wireless communication with a user equipment and in communication with one or more secondary nodes, after receiving an indication from the user equipment that a secondary cell group failure has occurred, determining by the master node which node of at least the master node or a last serving secondary node or another secondary node is responsible for the secondary cell group failure; and based on outcome of the determining, performing by the master node an analysis for mobility robustness for the secondary cell group failure where the master node was responsible for the secondary cell group failure.

Example 39. An apparatus, comprising:

one or more processors; and one or more memories including computer program code, wherein the one or more memories and the computer program code are configured, with the one or more processors, to cause the apparatus to:

in a secondary node, of a secondary cell group, in wireless communication with a user equipment and in communication with a master node, determine whether or not the secondary node sent an intra-node cell change command to the user equipment commanding the user equipment to perform the intra-node cell change; and in response to receiving from the master node a message corresponding to a secondary cell group failure, indicate to the master node by the secondary node whether or not the secondary node sent the command for the intra-node cell change without notifying the master node.

Example 40. A computer program product comprising a computer-readable storage medium bearing computer program code embodied therein for use with a computer, the computer program code comprising:

in a secondary node, of a secondary cell group, in wireless communication with a user equipment and in communication with a master node, determining whether or not the secondary node sent an intra-node cell change command to the user equipment commanding the user equipment to perform the intra-node cell change; and in response to receiving from the master node a message corresponding to a secondary cell group failure, indicating to the master node by the secondary node whether or not the secondary node sent the command for the intra-node cell change without notifying the master node.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

The following abbreviations that may be found in the specification and/or the drawing figures are defined as follows:

3GPP third generation partnership project
5G fifth generation
5GC 5G core network
AMF access and mobility management function
CU central unit
DC dual connectivity
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
G-RNTI Group-RNTI
ID identification
I/F interface
LTE long term evolution
LS liaison statement, which is sent between the different working groups of 3GPP
MAC medium access control
MDT minimization of drive tests
MME mobility management entity
MN master node
MR-DC multi-RAT dual connectivity
MRO mobility robustness optimization
ng or NG next generation
ng-eNB or NG-eNB next generation eNB
NR new radio
N/W or NW network
PCell primary cell
PDCP packet data convergence protocol
PHY physical layer
PSCell primary secondary cell
RACH random access channel
RAN radio access network
RAT radio access technology
Rel release
RLC radio link control
RNTI radio network temporary identifier
RRH remote radio head
RRC radio resource control
RU radio unit
Rx receiver
SCG secondary cell group
SDAP service data adaptation protocol
SGW serving gateway
SMF session management function
SN secondary node
SON self-organizing networks
SRB3 or SRB 3 signaling radio bearer #3
TS technical specification
Tx transmitter
UE user equipment (e.g., a wireless, typically mobile device)
UPF user plane function
WG working group
WI work item

What is claimed is:

1. An apparatus, comprising:

at least one processor;

at least one memory storing instructions, wherein the instructions, when executed by the at least one processor, cause the apparatus to perform, at least:

by a master node configured for wireless communication with a user equipment and for communication with one or more secondary nodes, after receiving a first indication from the user equipment that a secondary cell group failure has occurred, transmitting to a last serving secondary node a message corresponding to the secondary cell group failure;

receiving, by the master node from the last serving secondary node, information indicating whether or not the last serving secondary node is responsible for the secondary cell group failure;

based on the received information, determining by the master node which node of at least the master node or the last serving secondary node or another secondary node is responsible for the secondary cell group failure; and performing by the master node an analysis for mobility robustness for the secondary cell group failure when it is determined that the master node was responsible for the secondary cell group failure.

2. The apparatus of claim 1, wherein determining which node is responsible for the secondary cell group failure further comprises determining by the master node the last serving secondary node is the node responsible for the secondary cell group failure, based on the received information indicating the last serving secondary node was responsible for the secondary cell group failure; or determining which node is responsible for the secondary cell group failure further comprises determining by the master node the last serving secondary node is not the node responsible for the secondary cell group failure, based on the received information indicating the last serving secondary node was not responsible for the secondary cell group failure.

3. The apparatus of claim 2, wherein the received information comprises: one or both of a second indication the last serving secondary node was involved in an intra-node cell change without notifying the master node or an identification of a last serving cell that was involved in the secondary cell group failure, and the last serving secondary node is determined to be the node responsible for the secondary cell group failure, based on the received information.

4. The apparatus of claim 2, wherein the instructions, when executed by the at least one processor, cause the apparatus to further perform:

sending by the master node a message asking the last serving secondary node whether the last serving secondary node performed an intra-node cell change without notifying the master node; and wherein the received information comprises:

one or both of a second indication the last serving secondary node was involved in the intra-node cell change without notifying the master node or an identification of a last serving cell that was involved in the secondary cell group failure; and the transmitting by the master node the message corresponding to the secondary cell group failure toward the last serving secondary node is in response to the received information.

5. The apparatus of claim 2, wherein the instructions, when executed by the at least one processor, cause the apparatus to further perform: when it is determined by the master node the last serving secondary node is the node responsible for the secondary cell group failure, determining that the last serving secondary node is to perform the analysis for the mobility robustness for the secondary cell group failure.

6. The apparatus of claim 2, wherein the received information comprises a third indication the last serving secondary node was not involved in an intra-node cell change without notifying the master node, and wherein the performing by the master node the analysis when the master node was responsible in the secondary cell group failure comprises using the received information in the analysis by the master node for the mobility robustness, in response to the received information indicating that the last serving secondary node was not involved in the intra-node cell change without notifying the master node.

7. The apparatus of claim 6, wherein determining by the master node which node of at least the master node or the last serving secondary node or another secondary node is responsible for the secondary cell group failure further comprises determining by the master node the other secondary node is responsible for the secondary cell group failure and wherein the instructions, when executed by the at least one processor, cause the apparatus to further perform sending by the master node failure information for the secondary cell group failure toward the other secondary node.

8. An apparatus, comprising:

at least one processor;

at least one memory storing instructions, wherein the instructions, when executed by the at least one processor, cause the apparatus to perform, at least:

by a secondary node, of a secondary cell group, configured for wireless communication with a user equipment and for communication with a master node, receiving from the master node a message corresponding to a secondary cell group failure; determining whether or not the secondary node is responsible for the secondary cell group failure; and indicating to the master node by the secondary node whether or not the secondary node is responsible for the secondary cell group failure.

9. The apparatus of claim 8, wherein the indicating by the secondary node whether or not the secondary node is responsible for the secondary cell group failure comprises indicating the secondary node was responsible for the secondary cell group failure; or wherein the indicating by the secondary node whether or not the secondary node is responsible for the secondary cell group failure comprises indicating the secondary node was not responsible for the secondary cell group failure.

10. The apparatus of claim 9, wherein when the secondary node is the node responsible for the secondary cell group failure, the indicating comprises indicating information comprising one or both of a second indication the secondary node was involved in a cell change for the user equipment without notifying the master node or an identification of a last serving cell formed by the secondary node that was involved in the secondary cell group failure, and wherein the instructions, when executed by the at least one processor, cause the apparatus to perform an analysis for mobility robustness for the secondary cell group failure.

11. The apparatus of claim 9, wherein the instructions, when executed by the at least one processor, cause the apparatus to further perform:

receiving by the secondary node from the master node a message asking the secondary node whether the secondary node performed a cell change without notifying the master node, wherein the indicating comprises indicating information comprising one or both of a second indication the secondary node was involved in the cell change without notifying the master node or an identification of a last serving cell formed by the secondary node that was involved in the secondary cell group failure, and wherein the message corresponding to the secondary cell group failure is received in response to the indicated information; and performing by the secondary node an analysis for mobility robustness for the secondary cell group failure.

12. The apparatus of claim 9, wherein the indicating the secondary node was not responsible for the secondary cell group failure comprises indicating the secondary node was not involved in a cell change without notifying the master node, in response to determining that the secondary node is not the node responsible for the secondary cell group failure.

13. A method, comprising:

by a master node configured for wireless communication with a user equipment and for communication with one or more secondary nodes, after receiving a first indication from the user equipment that a secondary cell group failure has occurred, transmitting to a last serving secondary node a message corresponding to the secondary cell group failure;

receiving, by the master node from the last serving secondary node, information indicating whether or not the last serving secondary node is responsible for the secondary cell group failure;

based on the received information, determining by the master node which node of at least the master node or the last serving secondary node or another secondary node is responsible for the secondary cell group failure; and performing by the master node an analysis for mobility robustness for the secondary cell group failure when it is determined that the master node was responsible for the secondary cell group failure.

14. The method of claim 13, wherein determining which node is responsible for the secondary cell group failure further comprises determining by the master node the last serving secondary node is the node responsible for the secondary cell group failure, based on the received information indicating the last serving secondary node was responsible for the secondary cell group failure; or determining which node is responsible for the secondary cell group failure further comprises determining by the master node the last serving secondary node is not the node responsible for the secondary cell group failure, based on the received information indicating the last serving secondary node was not responsible for the secondary cell group failure.

15. The method of claim 14, wherein the received information comprises: one or both of a second indication the last serving secondary node was involved in an intra-node cell change without notifying the master node or an identification of a last serving cell that was involved in the secondary cell group failure, and the last serving secondary node is determined to be the node responsible for the secondary cell group failure, based on the received information.

16. The method of claim 14, further comprising:

sending by the master node a message asking the last serving secondary node whether the last serving secondary node performed an intra-node cell change without notifying the master node; and wherein the received information comprises:

one or both of a second indication the last serving secondary node was involved in the intra-node cell change without notifying the master node or an identification of the last serving cell that was involved in the secondary cell group failure; and the transmitting by the master node the message corresponding to the secondary cell group failure toward the last serving secondary node is in response to the received information.

17. The method of claim 14, further comprising: when it is determined by the master node the last serving secondary node is the node responsible for the secondary cell group failure, determining that the last serving secondary node is to perform the analysis for the mobility robustness for the secondary cell group failure.

18. The method of claim 14, wherein the received information comprises a third indication the last serving secondary node was not involved in an intra-node cell change without notifying the master node, and wherein the performing by the master node the analysis when the master node was responsible in the secondary cell group failure comprises using the received information in the analysis by the master node for the mobility robustness, in response to the received information indicating that the last serving secondary node was not involved in the intra-node cell change without notifying the master node.

19. The method of claim 18, wherein determining by the master node which node of at least the master node or the last serving secondary node or another secondary node is responsible for the secondary cell group failure further comprises determining by the master node the other secondary node is responsible for the secondary cell group failure and the method further comprises sending by the master node failure information for the secondary cell group failure toward the other secondary node.

20. A method, comprising:

by a secondary node, of a secondary cell group, configured for wireless communication with a user equipment and for communication with a master node, receiving from the master node a message corresponding to a secondary cell group failure; determining whether or not the secondary node is responsible for the secondary cell group failure; and indicating to the master node by the secondary node whether or not the secondary node is responsible for the secondary cell group failure.

21. The method of claim 20, wherein the indicating by the secondary node whether or not the secondary node is responsible for the secondary cell group failure comprises indicating the secondary node was responsible for the secondary cell group failure; or wherein the indicating by the secondary node whether or not the secondary node is responsible for the secondary cell group failure comprises indicating the secondary node was not responsible for the secondary cell group failure.

22. The method of claim 21, wherein when the secondary node is the node responsible for the secondary cell group failure, the indicating comprises indicating information comprising one or both of a second indication the secondary node was involved in a cell change for the user equipment without notifying the master node or an identification of a last serving cell formed by the secondary node that was involved in the secondary cell group failure, and the method further comprises performing an analysis for mobility robustness for the secondary cell group failure.

23. The method of claim 21, further comprising:

receiving by the secondary node from the master node a message asking the secondary node whether the secondary node performed a cell change without notifying the master node, wherein the indicating comprises indicating information comprising one or both of a second indication the secondary node was involved in the cell change without notifying the master node or an identification of a last serving cell formed by the secondary node that was involved in the secondary cell group failure, and wherein the message corresponding to the secondary cell group failure is received in response to the indicated information; and performing by the secondary node an analysis for mobility robustness for the secondary cell group failure.

24. The method of claim 21, wherein the indicating the secondary node was not responsible for the secondary cell group failure comprises indicating the secondary node was not involved in a cell change without notifying the master node, in response to determining that the secondary node is not the node responsible for the secondary cell group failure.

* * * * *